United States Patent [19]

DeGraaff et al.

[11] Patent Number: 4,513,981
[45] Date of Patent: Apr. 30, 1985

[54] RIDE-ON TOY VEHICLE WITH FRONT WHEEL DRIVE AND OUTBOARD FRONT WHEELS

[76] Inventors: Robert DeGraaff, 20 Kennedy Dr., Flanders, N.J. 07836; Michael Langeiri, 425 Inverness La., Longmeadow, Mass. 01106

[21] Appl. No.: 491,422

[22] Filed: May 4, 1983

[51] Int. Cl.³ .............................................. B62K 9/00
[52] U.S. Cl. ............................... 280/1.11 R; 296/177; D12/83
[58] Field of Search .............. 280/1.11 R, 1.1 R, 1.21, 280/1.22; 296/177; D12/108, 83

[56] References Cited

U.S. PATENT DOCUMENTS

| D. 213,511 | 3/1969 | Moribe . | |
|---|---|---|---|
| 1,796,339 | 3/1931 | Nicholson | 280/1.11 R |
| 3,151,872 | 10/1964 | Weber, Sr. | 280/1.11 R |
| 3,416,625 | 12/1968 | Narutani | 280/1.11 X |
| 3,684,046 | 8/1972 | Begleiter | 280/1.11 R |
| 3,842,928 | 10/1974 | Kishi | 180/214 |
| 4,361,338 | 11/1982 | Kuchenbecker et al. | 280/1.11 R |

Primary Examiner—John A. Pekar

[57] ABSTRACT

A child's pedal-powered vehicle simulating a four wheel drive vehicle includes a body on which there is rotatably supported a pair of rear wheels. Centrally of its front end portion is a drive and steering assembly which is rotatable within the body to effect rotation of a pedal-powered drive wheel at lower end thereof to effect turning motion of the wheel and thereby the vehicle. Mounted on the front end portion of the body outboard of the drive wheel are a pair of outboard front wheels which will readily move vertically on the body to adjust to differences in ground contour while presenting little resistance to turning of the vehicle. In one embodiment, there is included means for limiting the vertical movement so that these wheels will stop upward movement at a point where overturning might occur.

8 Claims, 9 Drawing Figures

RIDE-ON TOY VEHICLE WITH FRONT WHEEL DRIVE AND OUTBOARD FRONT WHEELS

BACKGROUND OF THE INVENTION

Various constructions have been proposed and marketed for children's ride-on toys including the conventional bicycles and tricycles. Because children enjoy fantasy and desire to simulate adult activity, frequently manufacturers strive to simulate the appearance of adult vehicles such as racing cars, military vehicles, etc. The development of relatively low cost techniques for molding or forming complex shapes from synthetic resin has enabled the industry to meet, and to capitalize upon, these desires of children.

Although both foot pedal and battery-powered motor propulsion mechanisms are employed in such ride-on toys, cost factors generally favor pedal propulsion. Moreover, the mechanism required for pedalling and steering is simpler and generally less costly for a tricycle type configuration rather than for a four wheeled configuration.

It is an object of the present invention to provide a novel child's vehicle employing a tricycle-type pedal power and steering assembly while simulating the appearance of a four wheeled vehicle.

It is also an object to provide such a vehicle in which a pair of outboard front wheels present initial resistance to movement and turning and move vertically to accommodate variations in ground contour.

Another object is to provide such a vehicle in which the outboard front wheels will stabilize the vehicle against overturning.

Still another object is to provide such a vehicle which may be fabricated readily and relatively economically.

SUMMARY OF THE INVENTION

It has now been found that the foregoing and related objects can be readily attained in a child's pedal-powered vehicle which includes a body providing a sidewall portion, a seat portion enclosed thereby and a top wall portion, and a drive and steering assembly having a rotatable steering column extending upwardly through the front portion of the body and centrally thereof. This assembly includes steering handle means adjacent the upper end of the column for effecting its rotation and drive wheel means rotatably mounted adjacent the lower end of the column. Pedal means is provided for effecting rotation of the drive wheel, and the drive and steering assembly is secured on the body for rotation relative thereto by suitable means.

A rear wheel assembly is comprised of axle means and a pair of rear wheels rotatably supported by the axle means adjacent the sidewall of the body, and is secured on the body by suitable means. A pair of outboard front wheels is disposed outwardly of the drive wheel and adjacent the sidewall of the body, and suitable means mounts these front wheels on the body for rotation upon motion of said vehicle over a surface and for limited vertical movement relative to the plane defined by the lowermost surfaces of the drive wheel and rear wheels. As a result, the front wheels have limited frictional contact with the support surface and move upwardly and downwardly independently of the drive wheel.

In one embodiment, the mounting means for the front wheels includes means limiting the amount of vertical movement thereof, so that these front wheels will minimize the likelihood of the vehicle overturning. This limiting means conveniently includes a bracket mounted on the body above the front wheel and having a generally vertically extending leg with a slot therein. The wheel mounting means includes axle means on which the wheel is rotatably mounted, with the axle means extending through the slot and being limited in the amount of vertical movement by the ends of the slot.

In the preferred embodiment, the front wheel mounting means includes a support rod having an outwardly extending portion upon which the wheel is supported, a forwardly extending portion extending to the front portion of the body sidewall, and a mounting portion extending generally parallel to the outwardly extending portion. A mounting recess is provided on the front portion of the sidewall to pivotably seat the rod mounting portion. As a result, the support rod will pivot in the recess to permit the vertical movement of the front wheels. Conveniently, this recess is provided by a bracket secured to the front portion of the sidewall.

Desirably, the body includes an outer body shell integrally formed from synthetic plastic sheet material and a unitary undercarriage upon which the outer body shell is supported. This undercarriage includes a rear portion in which is journalled the axle means to provide the securing means for the rear wheel assembly, and a front portion extending transversely of the body and seating the drive and steering assembly to provide the securing means therefor. In the preferred aspect of this construction, the vehicle additionally includes brace means extending between and secured to the front portion of the undercarriage and the front portion of the sidewall of the outer body shell.

DETAILED DESCRIPTION OF THE ILLUSTRATED EMBODIMENTS

Figure 1:
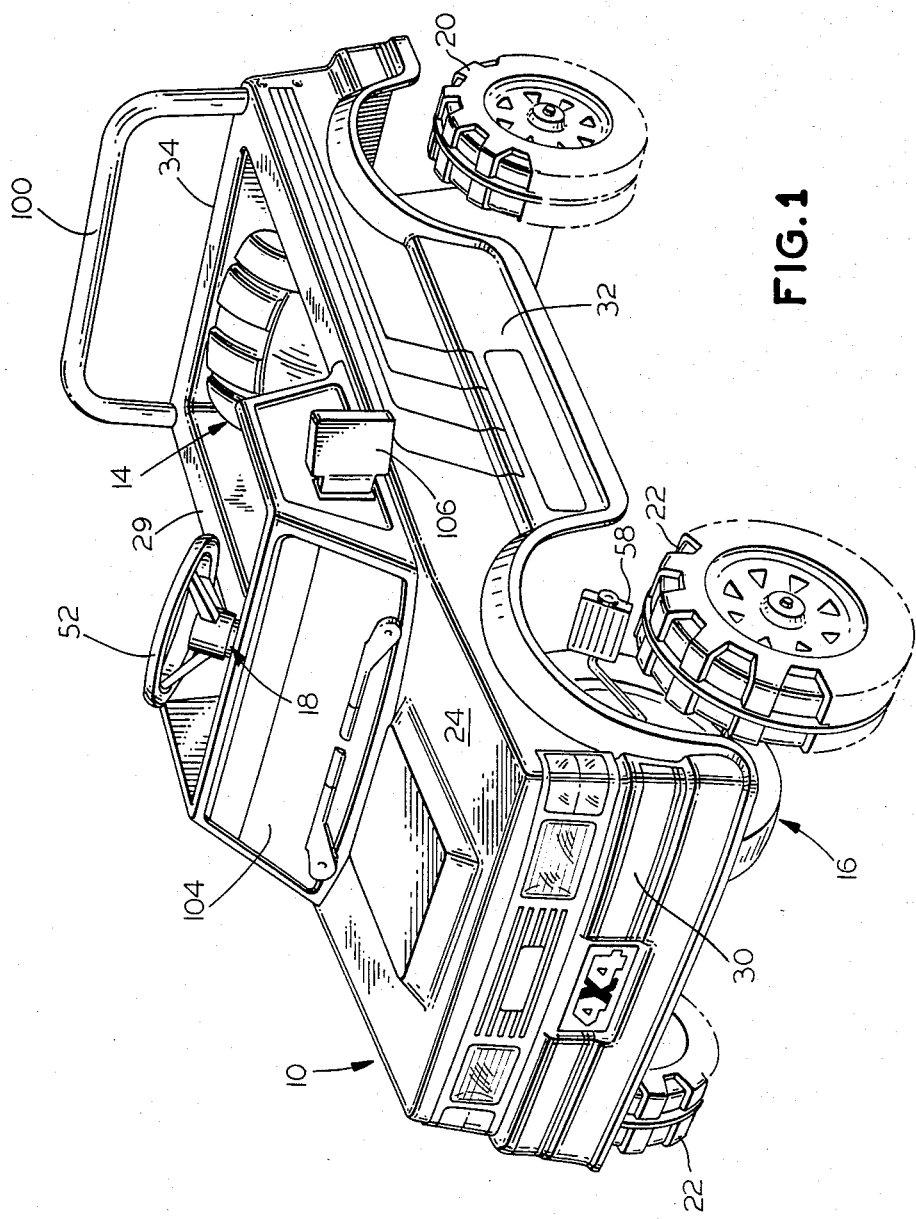
FIG. 1 is a perspective view of a child's vehicle embodying the present invention.
Figure 2:
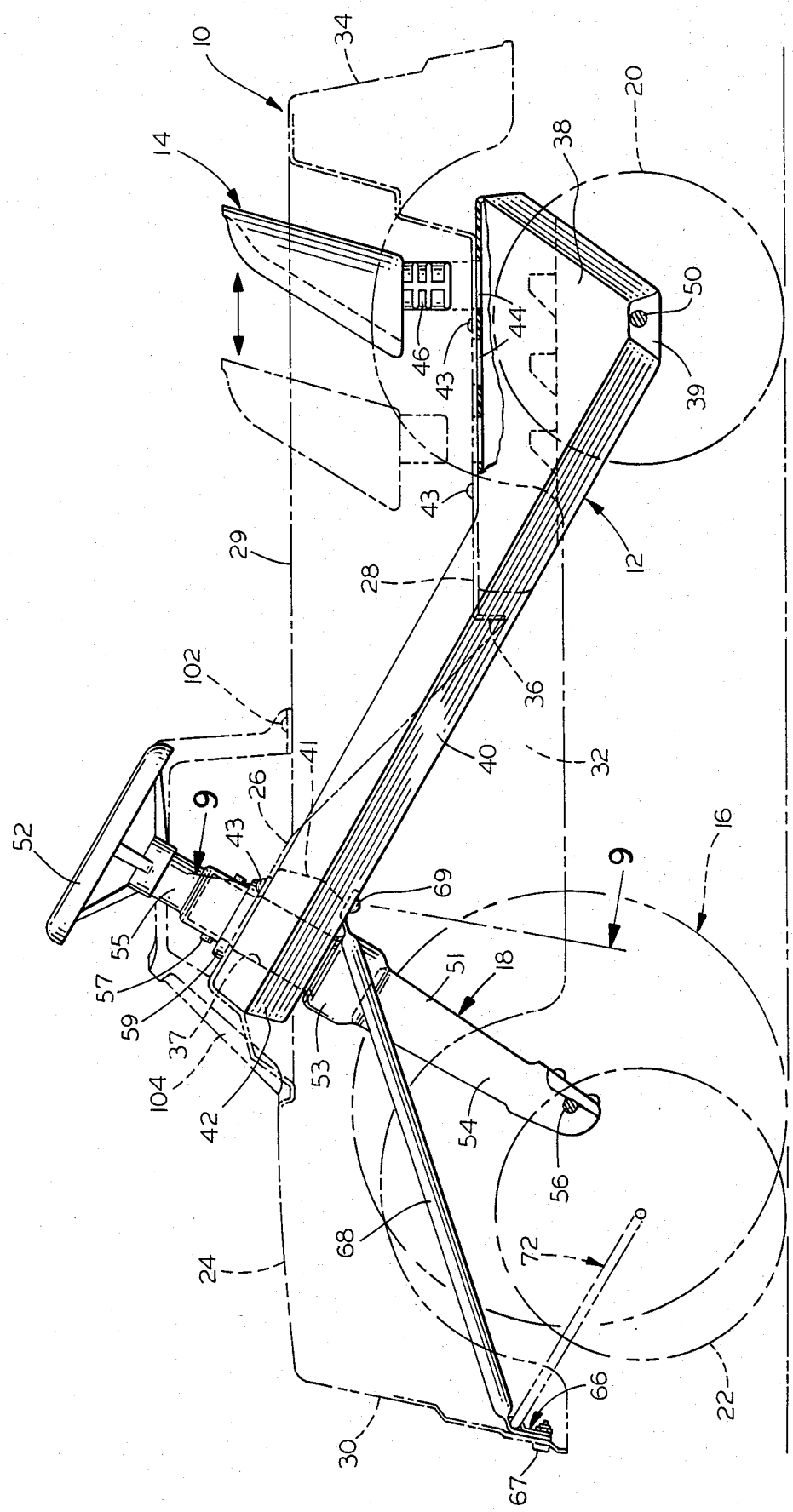
FIG. 2 is a side elevational view thereof with the body and various other elements in phantom line for clarity of illustration and with the backrest elevated from its seated position and shown in two alternate positions.
Figure 3:
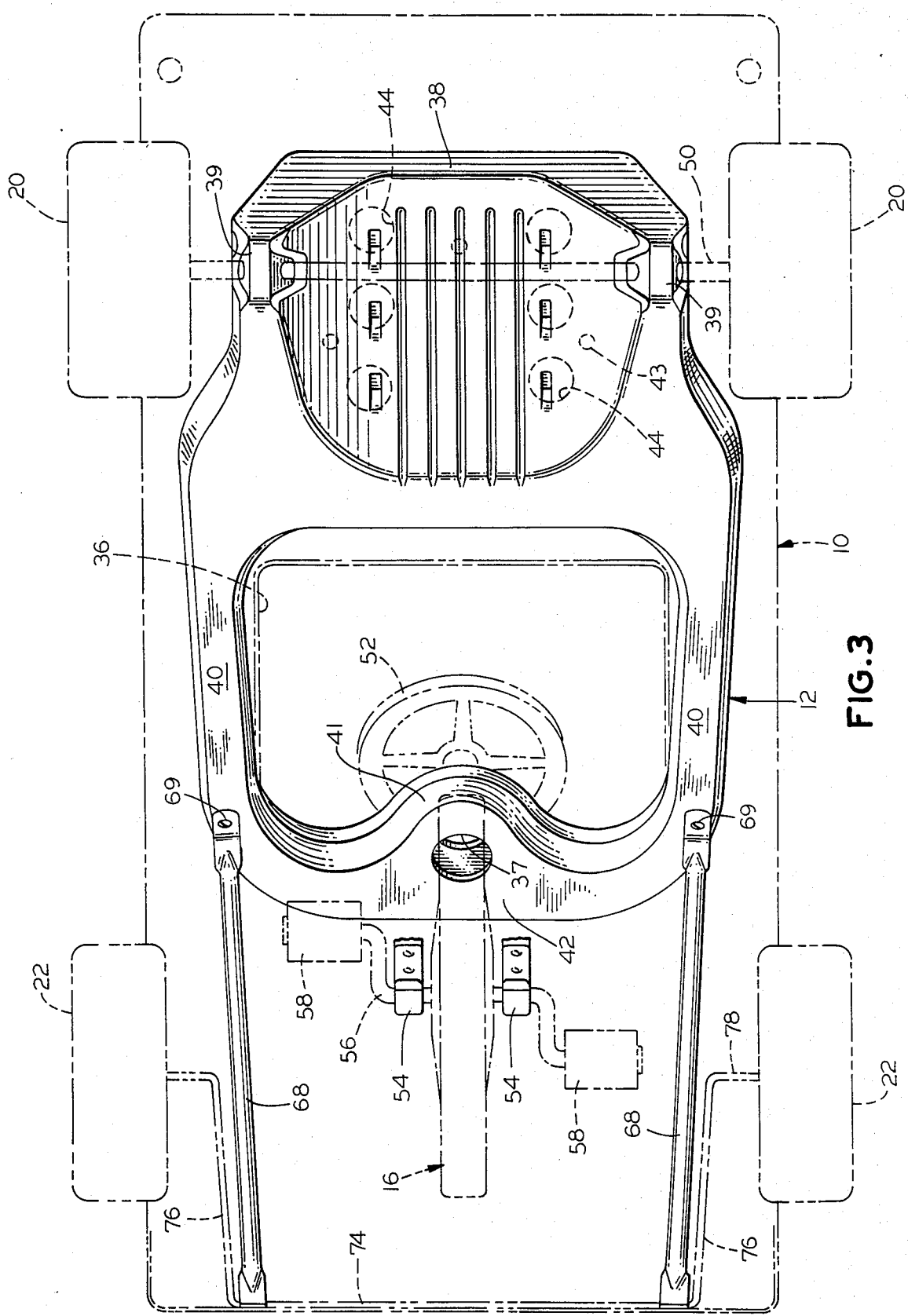
FIG. 3 is a bottom view thereof with the body, wheels, steering column and various other structural elements in phantom line for clarity of illustration.

Turning first to FIGS. 1-3, therein illustrated is a child's pedal powered vehicle which is generally comprised of a unitary body generally designated by the numeral 10 which is supported upon an undercarriage generally designated by the numeral 12. A separate seat back or backrest is generally designated by the numeral 14 and is movable between several positions. A pedal-driven front wheel 16 is disposed centrally of the body at the lower end of the drive and steering assembly generally designated by the numeral 18, and a pair of rear wheels 20 are provided on the undercarriage 12. In this vehicle, a pair of outboard front wheels 22 simulate the appearance of a four-wheeled vehicle while moving vertically relative to the body 10 as will be more fully described hereinafter.

The body 10 is conveniently thermoformed from a single sheet of thermoplastic material to provide a top wall portion generally comprised of the hood 24, dashboard depressed seat area 28, and the flange 29 including the seat area 28. The body also has a sidewall portion comprised of the grill area 30, sides 32 and rear 34. A large aperture or cutout 36 is provided in the top wall between the seat 28 and dashboard 26.

The undercarriage 12 is molded as a hollow structure and includes a rear portion 38 extending transversely of the rear portion of the body 10 under the seat 28, a pair of side portions 40 extending forwardly and upwardly from the rear portion 38, and a front portion 42 disposed under the dashboard 26. The flange 29 of the top wall portion of the body 10 is configured to seat over the side portions 40 of the undercarriage 12, and the dashboard 26 of the body 10 is formed so as to overlie the front portion 42. The rear portion 38 of the undercarriage 12 has depending legs 39 along its side margins, and the front portion 42 has a rearwardly extending arcuate mounting socket portion 41 with an angled passage 37 therethrough which registers with an aperture in the overlying dashboard portion 26.

The seat 28 of the body and rear portion 38 of the undercarriage 12, and the dashboard 26 of the body 10 and front portion 42 of the undercarriage 12, have cooperating apertures to seat fasteners 43 which secure the body 10 to the undercarriage 12. The seat 28 and the rear portion 38 also have several aligned pairs of spaced, relatively large apertures 44 which seat the depending posts 46 on the removable backrest 14 to provide adjustment for the size of the child using the vehicle.

A rear axle 50 extends transversely through the legs 39 of the rear portion 38 of the undercarriage 12 and rotatably supports the rear wheels 20 generally under the sides 32 of the body 10 in the simulated rear wheel wells.

The drive and steering assembly 18 is journalled in the passage 37 of the socket portion 41 of the undercarriage 12, and its axis of rotation extends downwardly and forwardly. As best seen in FIG. 2, the assembly includes a two-piece column comprised of the elongated section 51 which has an enlarged collar portion 53 and the cap section 55 which fits over the upper end of the section 51 and is secured thereto by the fasteners 57. The cap section 55 has a collar 59 at its lower end which provides the bearing surface and cooperates with the collar portion 53 to trap the undercarriage 12 and body 10 therebetween. At the upper end of the cap section 55 is provided a steering wheel 52 by which rotation of the assembly 18 may be effected and which is secured thereto by fasteners (not shown). At the lower end of the elongated section 51 is a forked portion 54 which rotatably clamps an axle 56 therein with the front wheel 16 supported thereon between the two forks. The axle 56 has offset crank-type drive pedal extensions 58 to permit the child to effect rotation of the front wheel 16 in either direction.

A pair of brackets generally designated by the numeral 66 is secured by fasteners 67 to the inner surface of the grill portion 30 of the body 10. Captured between the brackets 66 and the body 10 is a flattened portion at the front end of the reinforcing struts 68, and flattened portions at the other end thereof are secured to the side portions 40 of the undercarriage 12 by the fasteners 69.

Figure 5:
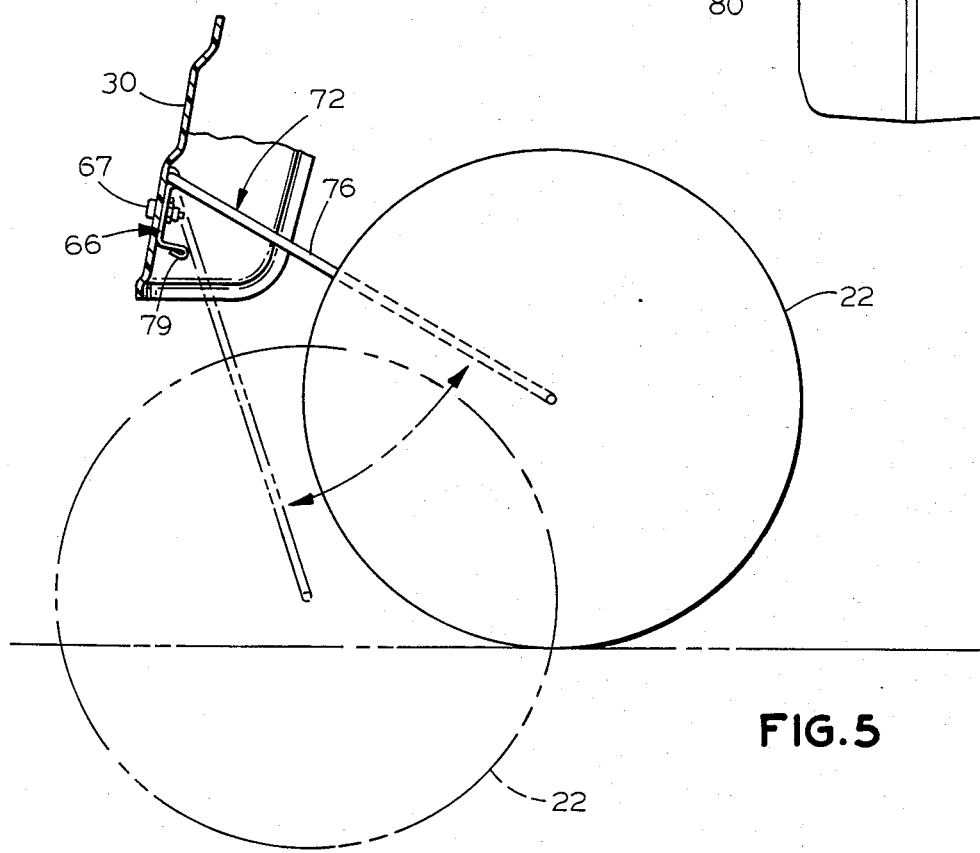
FIG. 5 is a partially diagrammatic fragmentary sectional view of the body, front wheel axle and support assembly, and the closest wheel, the wheel being illustrated in full line in a "normal" position and in phantom line in its lowermost position, and the reinforcing strut being omitted for clarity of illustration.
Figure 6:
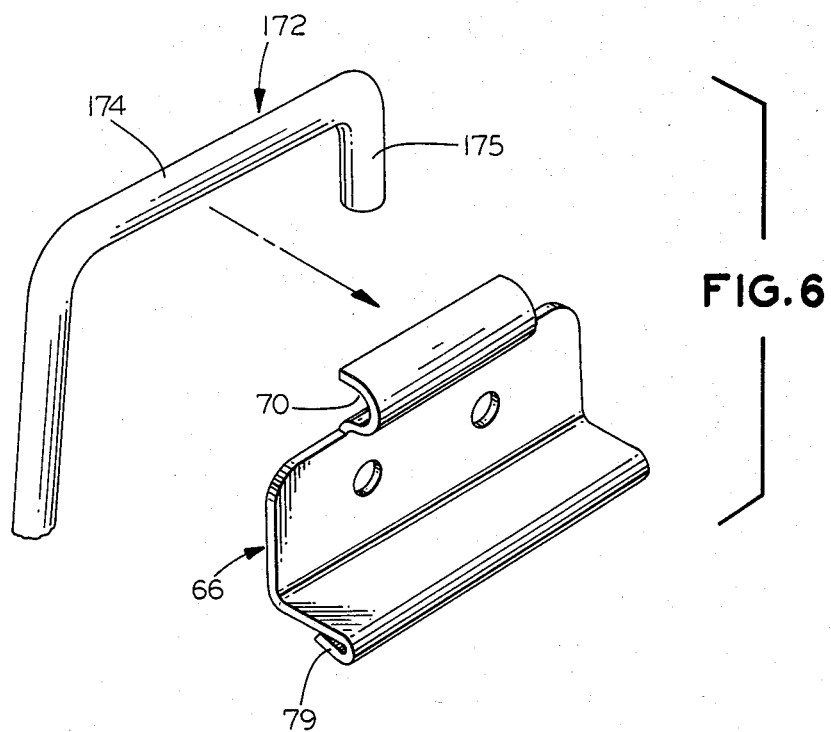
FIG. 6 is a perspective view of the front wheel support rod mounting bracket and of a portion of the front wheel axle rod disassembled therefrom.
Figure 7:
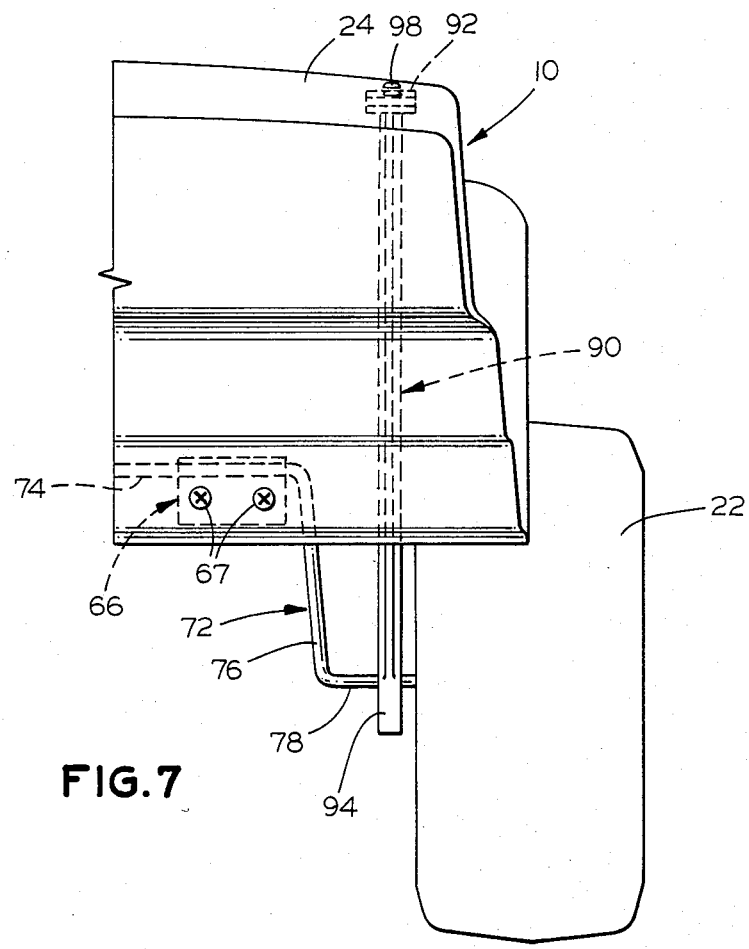
FIG. 7 is a fragmentary front elevational view of the vehicle showing an alternate embodiment of front wheel assembly utilizing a separate bracket for limiting the vertical movement of the front wheel.

Pivotably seated in the recess 70 of the bracket 66 is the front wheel support rod generally designated by the numeral 72. As seen in the embodiment of FIGS. 2 and 7, these have an elongated pivot portion 74 which seats in the recesses 70 of the pair of brackets 66, elongated side portions 76 extending rearwardly therefrom, and axle portions 78 upon which are rotatably mounted the front wheels 22. As shown in FIG. 5, the support rod 72 may pivot within the bracket recess 70 relatively freely over a substantial arc, movement downwardly being limited by abutment of the side portion 76 of the rod 72 against the stop ledge 79 on the bracket 66. In FIG. 6, the bracket 66 is shown in combination with an alternate embodiment of support rod 172. This arrangement uses separate support rods 172 for each of the front wheels with the pivot portion 174 having a reversely bent portion 175 to lock it in the bracket 66. In this embodiment, each front wheel 22 may move totally independently of the other without requiring flexure of a continuous pivot portion 74 of the other embodiment.

Figure 4:
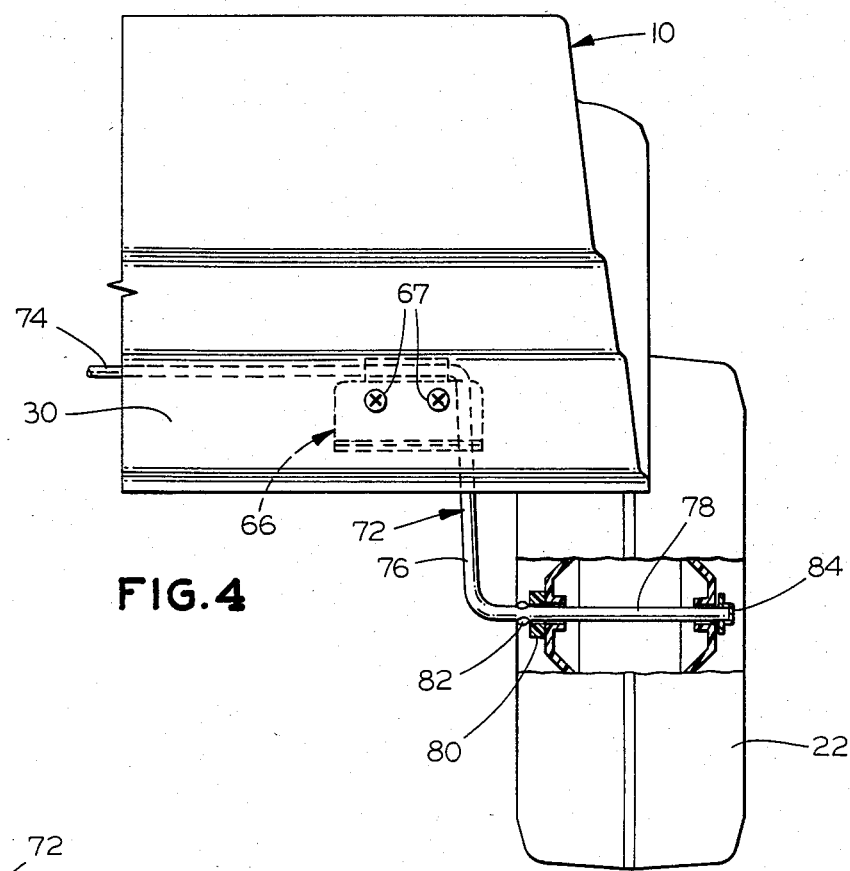
FIG. 4 is a fragmentary front view thereof with a portion of the wheel broken away to reveal internal construction and omitting surface ornamentation and various elements for clarity of illustration.

The front and rear wheels 20, 22 are of similar blow molded construction. As seen in FIG. 4, the front wheel 22 bears against a bushing 80 which bears against the bosses 82 on the axle portion 78 to locate the wheel 22 thereon. The wheel 22 is held on the axle portion 78 by the cap nut 84. The rear wheels 20 are similarly rotatably mounted on the rear axle 50.

Figure 8:
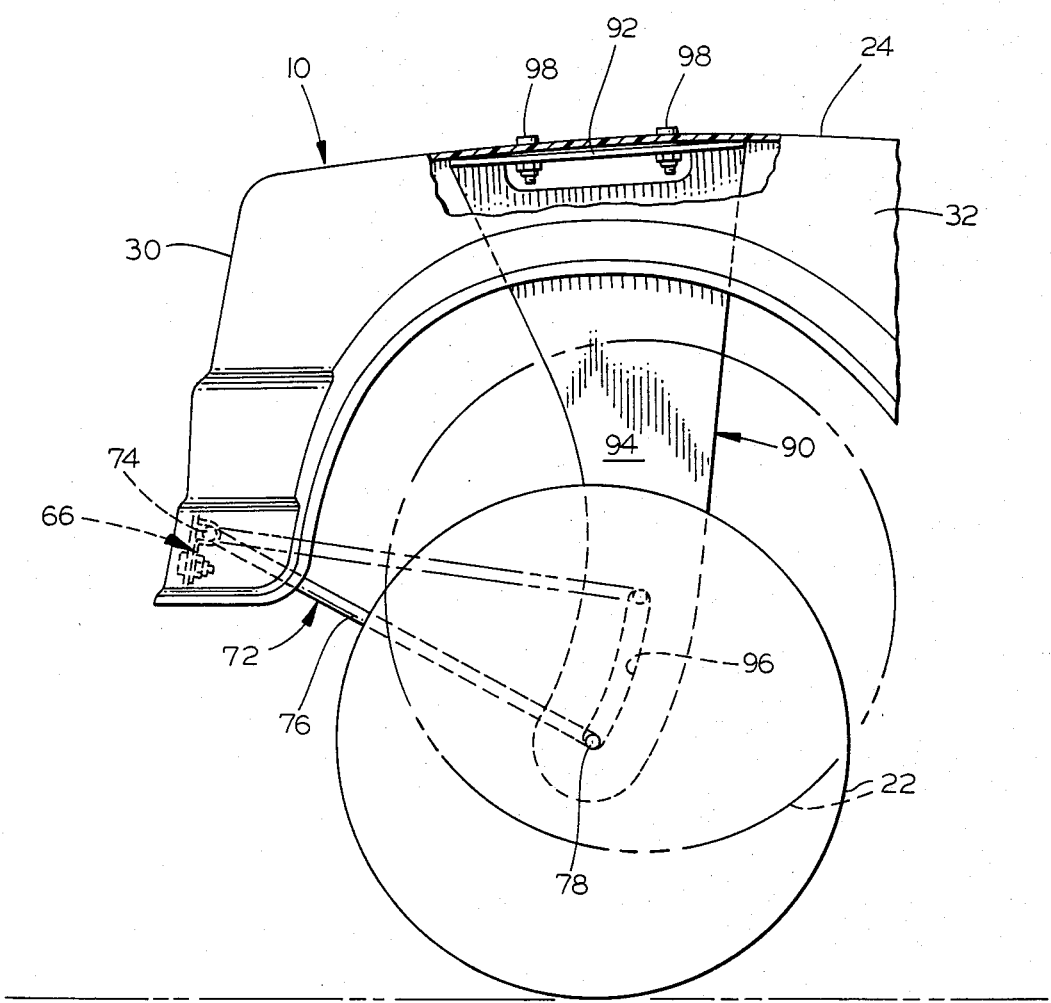
FIG. 8 is a fragmentary side elevational view of the embodiment of FIG. 7 with a portion of the body broken away for clarity of illustration and with the wheel and axle rod shown in phantom line in the two extremes of its limited vertical movement.
Figure 9:
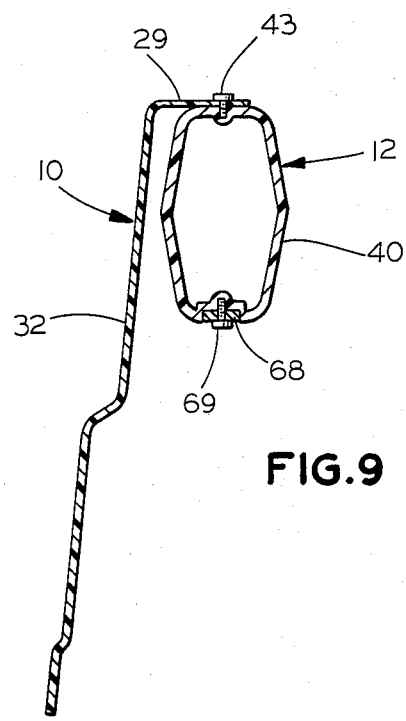
FIG. 9 is a fragmentary sectional view of the undercarriage, body and strut assembly along the line 9—9 of FIG. 2.

Turning now to FIGS. 7 and 8, therein illustrated is an optional front wheel movement limiting bracket generally designated by the numeral 90 which has a mounting flange 92 secured to the hood 24 of the body 10 by fasteners 98 above the simulated wheel well and an elongated leg 94 which extends vertically downwardly on the inner side of the wheel 22. Adjacent to its lower end, the bracket leg 94 has an arcuate slot 96 therein through which the axle portion 78 extends. As a result, the amount of vertical movement of the wheel 22 is limited by the length of the arcuate slot 96.

Seated in apertures in the top flange at the rear 34 of the body 10 is a roll bar 100 of inverted U-shaped configuration. Secured to the top wall of the body 10 about the dashboard 26 by fasteners 102 is an injection molded windscreen or "windshield" 104 which seats a rear view mirror 106. Various decals or other surface ornamentation may also be provided on the body 10.

In operation of the vehicle, the child simply pedals the drive wheel 16 and turns the steering wheel 52 to effect the turning movement of the drive wheel 16 and thereby the entire vehicle. Since the outboard front wheels 20 have only minimal contact with the ground and support only their own weight and a portion of the weight of the support rods 72, they move readily in an arc by pivoting of the support rod 72 and offer little resistance to the turning of the front end although they continue to rotate in parallel with the rear wheels 20. Thus, turning and powering of the vehicle is accomplished readily by a tricycle-type drive and steering assembly. However, to the child and playmates, the vehicle simulates the appearance of a four wheel drive vehicle.

Moreover, by providing relatively free vertical movement of the outboard wheels 22, they will appear to be in contact with the ground surface even if there is a significant difference in elevation between that under the drive wheel 16 and the outboard wheels 22 because the ground will move the wheels 22 upwardly and its own weight will move it downwardly. Even in the embodiment utilizing a single continuous rod 72 to support both outboard wheels 22, there is generally sufficient flexure over the length of the rod 72 so that both front wheels 22 will normally separately follow the ground contour.

For convenience in carrying the vehicle, the stop ledge 79 limits the amount of downward movement of the rod 72 and thereby of the wheels 22. If no stop were provided the wheels could pivot freely to a point where the center portion 76 of the rod 72 would abut the grill portion 30 of the body 10, thus making the vehicle unnecessarily cumbersome to carry and maneuver.

In the embodiment utilizing the wheel movement limiting bracket 90, the downward movement is limited by the end of the slot 96. Although it is generally not desirable for the outboard front wheels 22 to carry any significant loading, excessive tipping or overturning motion of the front end of the vehicle will cause the rod 72 to abut the upper end of the slot 96 of a bracket 90. At this point, the wheel 22 will carry a load translated to the body 10 by the bracket 90 and tend to stabilize the vehicle and preclude further overturning motion.

The several elements of the vehicle are readily fabricated and assembled. The body is conveniently thermoformed from resin sheeting which has good impact resistance such as high impact polystyrene and ABS; composite sheeting of high impact polystyrene with a surface layer of polystyrene for gloss is desirably employed.

Blow molding is conveniently used for fabricating the wheels, undercarriage, and steering column assembly with high density polyethylene being desirable as the resin. Injection molding is readily employed for the seat back, windscreen, and rear mirror, again using high density polyethylene as the resin.

The roll bar may be formed from extruded polyvinyl chloride tubing or from metal tubing.

The brackets are conveniently metal stampings or castings, and the struts are readily formed from metal tubing. The axles and front wheel support rods are formed from metal rod.

In assembling the vehicle, the rear axle is inserted into the undercarriage and the rear wheels are mounted thereon. The drive wheel and pedal assembly is inserted into the lower section of the steering column which is then slid upwardly through the aperture in the undercarriage. The body is then placed on the undercarriage and secured thereto by the fasteners. This subassembly is then turned upside down. The rearward end of the reinforcing struts is secured to the undercarriage, and the brackets are then secured to the inside surface of the grill portion of the body with the struts and front wheel support rod(s) in place therein. The outboard front wheels are then secured onto the support rods.

At this point, the assembly may be turned over to place the wheels on the floor or table. The upper portion of the steering column and the steering wheel are mounted, and the several remaining elements (windscreen, mirror, seatback and roll bar) may be mounted thereon.

Thus, it can be seen from the foregoing detailed specification and drawings, that the child's vehicle of the present invention readily employs a unitized tricycle-type front wheel drive and steering assembly while providing outboard front wheels to simulate a four wheeled vehicle. The outboard wheels present little frictional resistance to turning of the vehicle while moving readily to adapt to the ground contour and remain in contact therewith. In one embodiment, these outboard wheels may provide enhanced stability for the front end of the vehicle against overturning.

Having thus described the invention, We claim:

1. A child's pedal-powered vehicle comprising:
   A. a body providing a sidewall portion, a seat portion enclosed thereby and a top wall portion;
   B. a drive and steering assembly having a rotatable steering column extending upwardly through the front portion of said body and centrally thereof, said assembly including steering handle means adjacent the upper end of said steering member for effecting rotation thereof, said steering assembly having drive wheel means rotatably mounted adjacent the lower end of said column and pedal means for effecting rotation of said drive wheel;
   C. means securing said drive and steering assembly on said body for rotation relative thereto;
   D. a rear wheel assembly comprising axle means and a pair of rear wheels rotatably supported by said axle means adjacent said sidewall of said body;
   E. means securing said rear wheel assembly on said body;
   F. a pair of outboard front wheels disposed outwardly of said drive wheel and adjacent said sidewall of said body;
   G. means mounting said front wheels on said body for normal disposition in the plane defined by the lowermost surfaces of said drive wheel and said rear wheels for rotation upon motion of said vehicle over a surface and for limited vertical movement relative to the plane defined by the lowermost surfaces of said drive wheel and rear wheels, whereby said front wheels have limited frictional contact with the support surface and move upwardly and downwardly independently of said drive wheel.

2. The child's vehicle of claim 1 wherein said mounting means for said front wheels includes means limiting the amount of vertical movement thereof, whereby said front wheels will minimize the likelihood of said vehicle overturning.

3. The child's vehicle of claim 1 wherein said front wheel mounting means includes a support rod having an outwardly extending portion upon which said wheel is supported, a forwardly extending portion extending to the front portion of said sidewall, and a mounting portion extending generally parallel to said outwardly extending portion, and a mounting recess on said front portion of said sidewall pivotably seating said rod mounting portion, whereby said support rod will pivot in said recess to permit said vertical movement of said front wheels.

4. The child's vehicle of claim 3 wherein said recess is provided by a bracket secured to said front portion of said sidewall.

5. The child's vehicle of claim 2 wherein said limiting means comprises a bracket mounted on said body above said front wheel and having a generally vertically extending leg with a slot therein, and wherein said wheel mounting means includes axle means on which said wheel is rotatably mounted, said axle means extending through said slot and being limited in the amount of vertical movement by the ends of said slot.

6. The child's vehicle of claim 1 wherein said body includes an outer body shell integrally formed from synthetic plastic sheet material and a unitary undercarriage upon which said outer body shell is supported, said undercarriage including a rear portion in which is journalled said axle means to provide said securing means for said rear wheel assembly.

7. The child's vehicle of claim 6 wherein said undercarriage includes a front portion extending transversely of said body and seating said drive and steering assembly to provide said securing means therefor.

8. The child's vehicle of claim 6 wherein said vehicle additionally includes brace means extending between and secured to the front portion of said undercarriage and the front portion of said sidewall of said outer body shell.

* * * * *